May 3, 1949.  F. S. LOW  2,468,766
RECOVERY OF CHLORINE FROM HYDROGEN CHLORIDE
Filed April 7, 1944  2 Sheets-Sheet 1
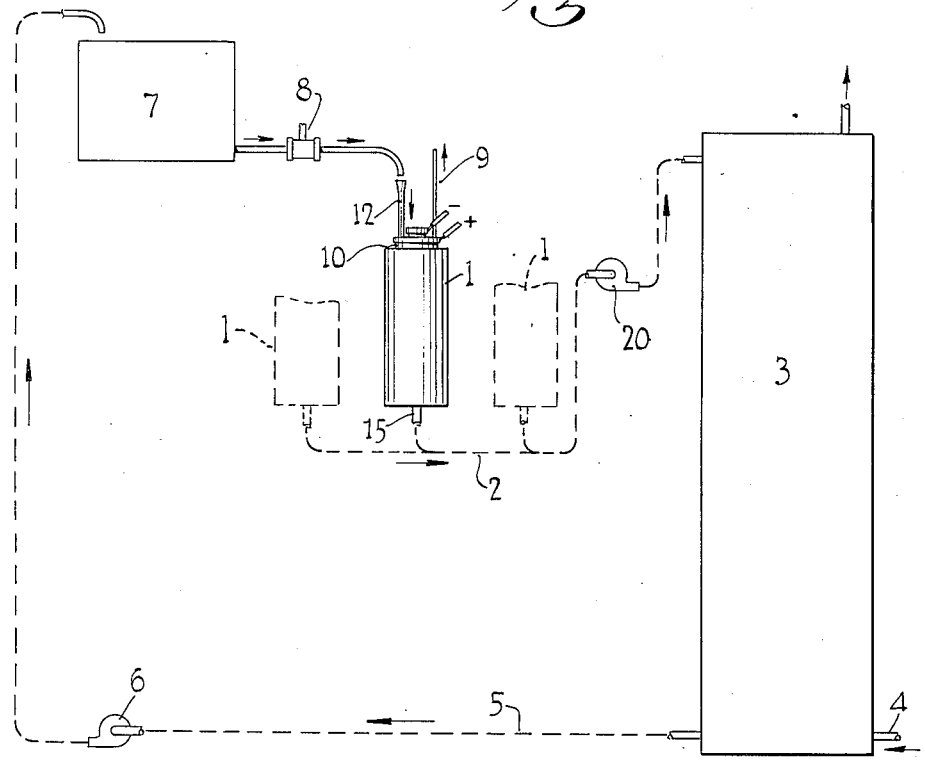
Fig. I.
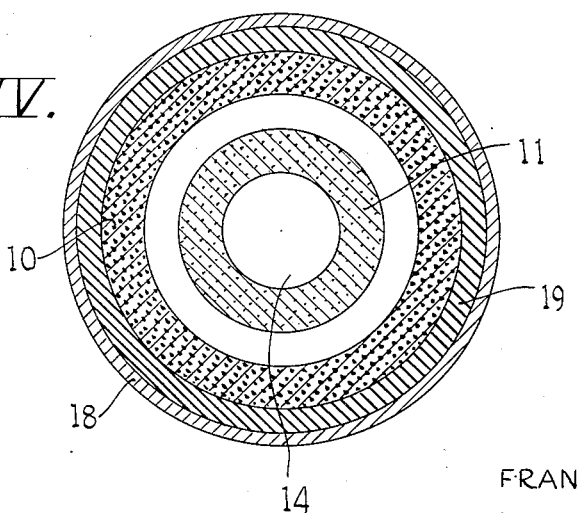
Fig. IV.
INVENTOR
FRANK S. LOW May 3, 1949.  F. S. LOW  2,468,766
RECOVERY OF CHLORINE FROM HYDROGEN CHLORIDE
Filed April 7, 1944  2 Sheets-Sheet 2
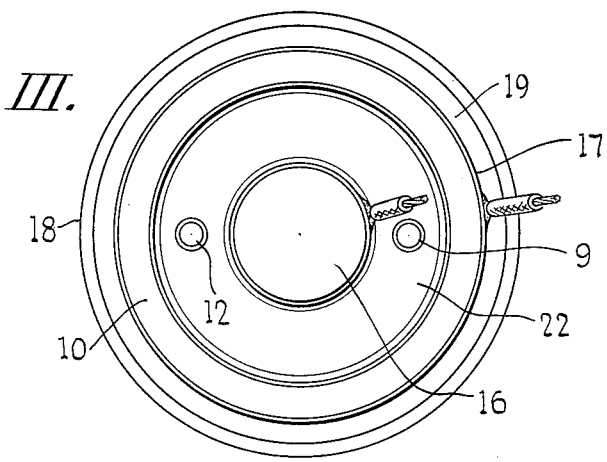
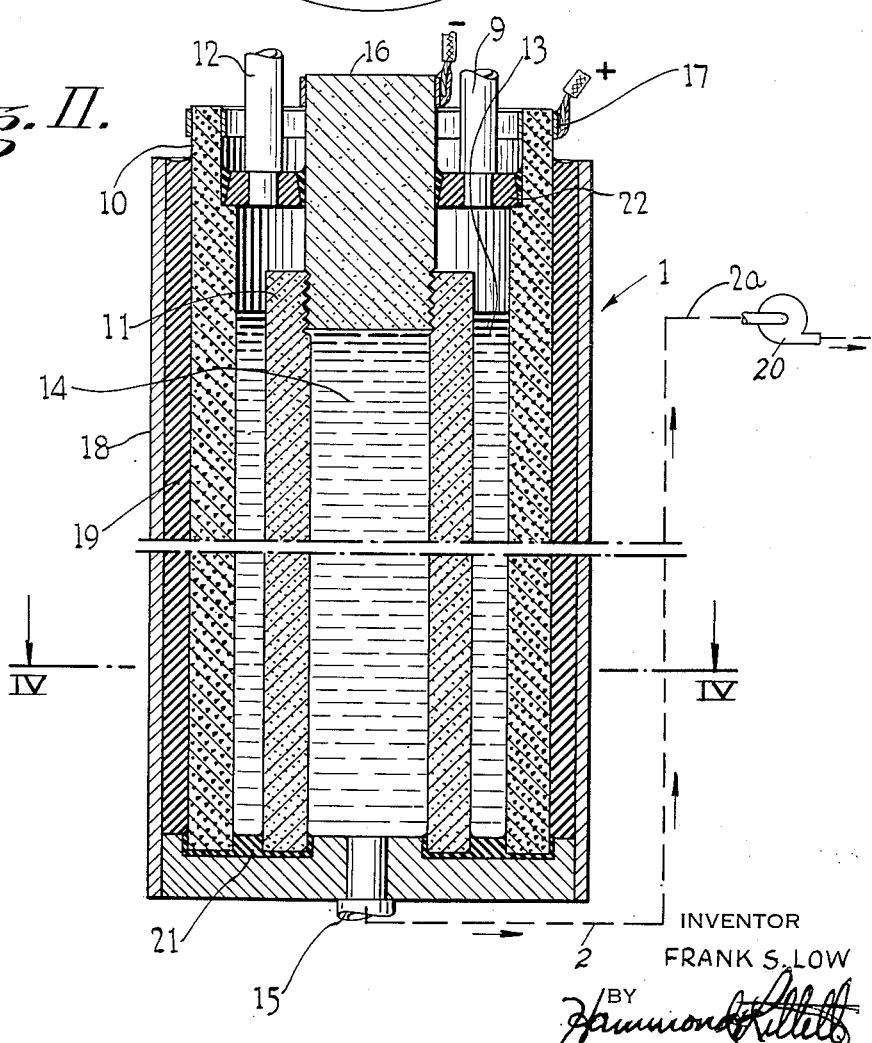
INVENTOR
FRANK S. LOW
BY
ATTORNEYS Patented May 3, 1949

2,468,766

UNITED STATES PATENT OFFICE 2,468,766

RECOVERY OF CHLORINE FROM HYDROGEN CHLORIDE

Frank S. Low, Bronxville, N. Y., assignor to Food Machinery and Chemical Corporation, New York, N. Y., a corporation of Delaware Application April 7, 1944, Serial No. 529,926

2 Claims. (Cl. 204—128)

This invention relates to the recovery of chlorine values from by-product hydrogen chloride, and more particularly it relates to an economical process for the recovery of chlorine from HCl by electrolysis of a metallic chloride.

By-product hydrochloric acid is obtained in a large number of industrial processes such as in substitution chlorination of organic compounds, manufacture of salt cake from sodium chloride by reaction with sulphuric acid or with $SO_2$ and oxygen; preparation of synthetic resins, ethylene glycol derivatives, etc. The economic feasibility of many of these operations depends upon finding a satisfactory process for recovering the chlorine contained in the by-product hydrogen chloride. In the past, attempts have been made to solve this problem by the direct electrolysis of hydrochloric acid but this process proved to be unsatisfactory because the costs of operation for power and maintenance were excessive.

Other attempts have been made to recover chlorine from hydrogen chloride by the so-called Deacon process. In this process, hydrogen chloride with sufficient oxygen or air is passed over an oxidation catalyst resulting in the formation of chlorine and water. The chlorine so obtained is impure, being admixed with unreacted hydrogen chloride, oxygen or air, and contains considerable water which makes the gases difficult to handle. For these reasons, costs of the process are prohibitive. It is usually cheaper to discard the hydrogen chloride than it is to recover the chlorine therefrom by this process. Improvements in the process which have been suggested, such as use of different catalysts, the use of pure oxygen and the like, have not overcome the objections to it.

It is an object of my invention to provide an economical process for recovering chlorine values from hydrogen chloride or hydrochloric acid by electrolytic reduction of a metallic chloride such as cupric chloride or ferric chloride with production of pure chlorine and a cuprous or ferrous chloride which is subsequently reoxidized to cupric or ferric chloride with hydrogen chloride and oxygen, and is recycled for further electrolysis.

Another object of my invention is to provide a process for the production of chlorine from hydrogen chloride or hydrochloric acid by electrolytic reduction of a metallic chloride such as ferric or cupric chloride having a low rate of power consumption, and producing pure chlorine and a reduced metallic chloride which may be subsequently reoxidized with hydrogen chloride and oxygen and again reduced by electrolysis to recover chlorine.

A further object of my invention is provision of a process for obtaining pure chlorine from hydrogen chloride or hydrochloric acid by electrolysis in a cell and under conditions in which chemical attack on the structural members of the cell is substantially eliminated.

Still another object of my invention is to provide a method for obtaining pure chlorine in a continuous process in which a metallic chloride such as, for example, cupric or ferric chloride, is reduced by electrolysis to cuprous or ferrous chloride with the liberation of chlorine and the reduced cuprous or ferrous chloride is continuously withdrawn from the electrolytic cell and replaced with cupric or ferric chloride.

Another important object of my invention is to use an electrolyte containing hydrochloric acid and the cupric or ferric chloride which is reduced, so that in recovering chlorine from hydrogen chloride additional hydrogen chloride may be introduced in the oxidizing tower or to the electrolyte to replace the chlorine which is recovered from the cupric or ferric chloride without materially changing the composition of the electrolyte or its conductivity.

Various other objects and advantages of my invention will appear as this description proceeds.

I have discovered a process by which chlorine values may be recovered from hydrogen chloride or hydrochloric acid at low cost in which hydrogen chloride or hydrochloric acid with oxygen is used to oxidize cuprous or ferrous chloride to cupric or ferric chloride by contacting the same in an oxidizing unit and the metallic chloride of the higher valence is electrolyzed in an electrolytic cell, producing pure chlorine at the anode and a reduced metallic chloride such as cuprous or ferrous chloride at the cathode. The reduced electrolyte is simultaneously withdrawn from the cell through a porous cathode, then recycled to the oxidizing unit and the process is repeated.

To make this process commercially operative at low cost, it is important to control conditions of operation within the limits and conditions set forth hereinbelow.

The process will be more readily understood by reference to the attached drawings which illustrate one method by which and one apparatus in which the process may be practiced. In the embodiment illustrated:

Figure I is a schematic diagram of the process as a whole.

Figure II is a vertical section through one type of electrolytic cell.

Figure III is a plan view of the cell shown in Figure II; and

Figure IV is a horizontal section through the cell on a line IV—IV of Figure II.

In Figure I, the electrolytic cell or cells in which cupric or ferric chloride is electrolyzed is designated as 1. From this cell partially reduced electrolyte containing cuprous or ferrous chloride passes through a pipeline 2 to an oxidizing unit 3 in which it is oxidized with hydrogen chloride and oxygen introduced through the pipeline 4. The oxidized metallic chloride solution formed leaves the oxidizing unit (the exit gases being vented off) through an outlet pipeline 5 and is circulated by pump 6 to a storage unit 7 from which it is fed at a predetermined rate to the cell 1 through the pipeline shown. Preferably a heater unit 8 is inserted in the line so that the temperature of the electrolytic solution fed to the cell may be controlled. If desired, the water which forms in the chloride during the reoxidation step may be removed before it is reintroduced into the cell by any suitable heating means (not shown).

The chlorine produced is withdrawn from the cell 1 through an exit pipeline 9. The anode and cathode of the electrolytic cell are connected to a suitable external source of direct current.

A cell construction which I have found to be satisfactory for commercial production of chlorine is shown in Figure II. In this figure, there is shown a cylindrical anode 10 made of a standard electrode grade of relatively impervious graphite, and a cylindrical porous graphite cathode 11 having a predetermined permeability. The cylindrical porous graphite cathode is centered inside the anode in such a way that a uniform electrolyte gap of a value between about ½" to 1" is obtained. The electrolyte enters this cell at a predetermined rate through line 12 into the annular chamber 13 and is partially reduced at the cathode. Chlorine is formed at the anode and leaves the cell through the exit pipeline 9. The partially reduced electrolyte under slight hydrostatic pressure passes from the chamber through the porous graphite cathode into a chamber 14 and flows from the cell through line 15, in the bottom. Electrical connection is made through a standard graphite rod 16 which is threaded or otherwise connected into the top of the cylindrical porous graphite cathode. Electrical connection is made with the anode through a metal band 17 around the cylindrical anode. To eliminate any possibility of electrolyte leakage through the anode, the entire cell is mounted in a container 18 and held therein by an impervious material such as high-melting pitch 19 between the anode and the container wall. A pump 20 or other equivalent means may be placed in the electrolyte exit line 2 to pump the electrolyte to the top of the tower 3, and the exit line 2 may be carried to a height 2a which maintains the desired electrolyte level in the cell.

The upper portion of the anode 10 is suitably impregnated as with halowax to prevent chlorine seepage. Likewise, the graphite rod 16 connected to the cathode 11 and the upper portion of the cathode into which the rod 16 is threaded is impregnated for the same purpose.

The anode 10 and the cathode 11 are sealed to the base plate of the container 18 by high-melting pitch 21 or with other suitable luting material. The cell is closed at the top by a plate 22 which is sealed to the anode 17 and graphite rod 16 likewise by high-melting pitch.

Although in Figure II a cylindrical anode and cathode are shown, other geometrical forms may be used including, for example, rectangular and polygonal cathodes and anodes. Also while a particular cell in which the cathode is placed inside the anode is shown, the invention contemplates the use of cells of a different construction in which the anode is placed on the inside of a porous cathode thereby allowing the electrolyte to flow outwardly rather than inwardly. There are certain disadvantages in this latter construction as explained hereinbelow.

Furthermore, it is not necessary that the cathode and anode be of annular shape or concentrically arranged. Flat electrodes placed either horizontally or vertically may also be used. There are, however, certain operating disadvantages in the use of a horizontal cathode such as gas blanketing. I have operated cells with horizontal electrodes, however, and have found them particularly effective with a diaphragm such as sand or other inert material laid directly on the cathode, particularly at low current densities.

Instead of graphite anodes and cathodes, any good grade of conducting carbon may be used.

The oxidizing unit 3 may be either a tower having therein a suitable acid resistant packing over which the reduced electrolyte is passed from the upper portion of the tower while oxygen and hydrogen chloride are passed countercurrent to the flow of electrolyte from the bottom; alternatively, the oxygen and hydrogen chloride may be passed concurrently with the flow of electrolyte and withdrawn from the bottom of the oxidizing unit; or a liquid column of electrolyte into which a mixture of hydrogen chloride and oxygen is finely dispersed; or a chamber in which the electrolyte is sprayed into contact with the hydrogen chloride and oxygen. Although in Figure I, I have shown a single oxidizing tower for a single cell or for several cells, one of the advantages of my process is that a single oxidizing tower may be used for a number of cells and such a system gives economical results.

In the oxidizing tower the oxygen or air and the hydrochloric acid or anhydrous HCl may be introduced simultaneously or additional hydrochloric acid may be introduced into the electrolyte either before it enters the tower or after leaving the tower, and only oxygen or air blown into the tower.

My process may be operated with a wide variation in conditions, and since many of the variables are interdependent, a change in one variable effects a change in others. However, I have generally found that the cell may be operated satisfactorily within the scope of the range of variables noted hereinbelow.

An electrolyte which I have found satisfactory for the practice of my invention comprises cupric chloride in a concentration of about 15 percent by weight (or a chemically equivalent amount of ferric chloride), about 20 percent hydrogen chloride by weight, and the balance water. I have discovered that this electrolyte does not attack graphite at an appreciable rate. Further, I have found that the presence of hydrochloric acid during the electrolysis tends to keep the metallic chloride in solution so that difficulties such as precipitation of insoluble metallic chloride on the cathode or other cell parts are eliminated.

The use of hydrogen chloride in the electrolyte greatly facilitates the operation of the process as it permits the addition of regulated amounts of the by-product hydrogen chloride from which the chlorine is recovered into the electrolyte as it flows through the cycle without upsetting the electrolyte composition.

The concentration of metallic chloride in the electrolyte may be varied over wide limits. The upper limit for metallic chloride concentration is the solubility of the chloride in the electrolyte. It is desirable to keep the concentration of the metallic salt in the electrolyte high. At room temperature, the solubility limit for cupric chloride in a solution containing 20 percent HCl is about 17 percent by weight and for ferric chloride approximately a chemically equivalent concentration. At higher temperatures the solubility is higher. However, lower concentrations of metallic chloride may be used, but in that event it is necessary to circulate more electrolyte to the cell to secure a given output of chlorine. I find that at concentrations below 5 percent cupric or ferric chloride, an excessive amount of electrolyte must be circulated and furthermore, oxidation of the effluent cuprous or ferrous chloride from the cell becomes more difficult. The optimum concentration of cupric chloride in the electrolyte is about 15 percent, and of ferric chloride about 18 percent.

The hydrochloric acid concentration of the electrolyte may also be varied over wide limits. In the lower concentrations, the resistance of the electrolyte is high, causing high power consumption. Also, at the lower concentrations, there is a tendency toward precipitation of reduced metallic chloride. About 5 percent concentration of HCl in the electrolyte represents the practical lower limit since lowering the concentration below that amount causes the resistance of the electrolyte to rise rapidly. Practically considered, the upper limit of hydrogen chloride concentration is about 25 percent since at higher concentrations HCl tends to be driven from the electrolyte with the chlorine. This results in inefficient operation and impure chlorine.

An electrolyte of approximately 15 percent by weight of cupric chloride and 20 percent of hydrogen chloride has high chlorine carrying capacity and low corrosiveness with respect to graphite. A solution of this composition is less corrosive than a solution of hydrochloric acid alone. I have found no evidence of attack on graphite used for construction of my cell by this electrolyte composition over long periods of use which result is in contrast to the severe attack of hydrochloric acid on graphite. Furthermore, this solution is readily oxidized, making it suitable for cyclic operation in which the electrolyte is repeatedly electrolyzed and then reoxidized with HCl and oxygen. By virtue of the fact that additional hydrogen chloride may be readily added either before, during or after the oxidizing step to keep the hydrogen chloride at the desired concentration, the process has great flexibility. The high acidity keeps the metallic chloride in solution and eliminates cathode plugging difficulties or deposition of salts in the circulating lines. If the acid concentration in the electrolyte is not maintained sufficiently high to prevent the precipitation of insoluble compounds at the cathode, the voltage of the cell will slowly rise and the power consumption of the cell will become excessive. Accordingly, it is an important part of my invention to maintain the hydrogen chloride concentration in the electrolyte at a high level, preferably within the range noted hereinabove.

The use of a porous graphite cathode eliminates the necessity of a diaphragm, and this omission removes one of the principal difficulties which is ordinarily encountered in the electrolyzing of hydrochloric acid solutions directly. There are only a few materials which are satisfactory for use as diaphragm media in a solution containing substantial quantities of hydrochloric acid. Even acid leached asbestos tends to disintegrate slowly in such a solution and glass wool tends to dissolve slowly in the solution. By eliminating the diaphragm, the cell construction is greatly simplified, and the voltage requirements of the cell are reduced.

The performance of the cell is greatly influenced by the permeability of the graphite or other carbon used as the cathode, but cathodes having a wide range of porosity may be used. I prefer ordinarily to use a material having a permeability of about 30 gallons of water per square foot per minute at 5 lbs./sq. in. pressure, but cathodes having as high a permeability as 175 gallons/sq. ft./min. at 5 lbs. per sq. in. pressure and as low as .3 gal./sq. ft./min. at 5 lbs. per sq. in. pressure may be used with satisfactory results provided suitable adjustments in operating conditions are made. All of the above permeabilities are based on the flow of water at 70° F. through graphite pieces 1" thick. Because of the porosity of the graphite used, the cathode is ordinarily run submerged, that is with the liquid level on the exit side of the cathode about as high as that on the inlet side, as indicated by the liquid levels shown in the chambers 13 and 14 in Figure II.

The thickness of the porous graphite cathode should be uniform and may be from about ¼" to about 1½", or even thicker. The thicker sections are desirable because they show increased strength. Also, the thicker sections have greater electrical conductivity with resulting decrease in power consumption.

The anode may be any resistant material that conducts electricity and should be impervious or should be backed up with an impervious material. I find that ordinary electrode grade graphite is satisfactory.

I have found that for any given set of conditions there is an optimum flow rate for minimum power consumption in my cell. However, the cell may be operated over a very wide range of flow rates above the minimum flow rate required to introduce metallic chloride ions into the cell as fast as they are reduced at the cathode. The minimum flow rate will depend upon the concentration of metallic chloride and the current density at which the cell is operated. For example, the optimum flow rate at a current density of 168 amperes/sq. ft. with a feed containing about 188 grams/liter of cupric chloride is approximately 2.7 gal./hr./sq. ft of cathode area. At higher current densities, larger amounts of electrolyte would be required and conversely, at lower current densities, smaller flow rates are sufficient.

The flow rate should be such as to sweep the reduced cuprous or ferrous chlorides through the cathode substantially as rapidly as they are formed and thus quickly separate the reduced electrolyte from the unreduced electrolyte flowing into the cell. If the flow rate through the cathode is such as to permit substantial amounts of partially reduced cuprous chloride, for example, to remain in the portion of the cell between the anode and the cathode, this appears to react with the dissolved chlorine in the electrolyte and reduces the current efficiency.

It is possible to operate the cells described at higher current densities than is ordinarily thought feasible for the electrolytic production of chlorine. For example, in cells (other than mercury cells) which produce chlorine by electrolysis of sodium chloride solutions, current densities above 85 amperes/sq. ft, are not deemed practical or desirable whereas, as in my improved cell, I may use current densities twice as high. For instance, I have operated certain cells at a current density of 168 amperes/sq. ft. at high efficiency, and in some cases have even carried the current density up to 252 amperes/sq. ft., even to 500 amperes/sq. ft. At the higher current densities there is a corresponding increase in voltage and above about 500 amperes/sq. ft. this increase in voltage results in high power consumption per pound of chlorine produced. I prefer, therefore, to keep the current density below that figure. Another important discovery made in connection with this cell is that the current density at the cathode is less critical than at the anode and I take advantage of this fact in my improved cell construction by making the porous graphite cathode the inner cylinder which, having a smaller area, gives a higher current density for any given load, and I am able to do this with a minimum loss in power efficiency.

In the direct electrolysis of hydrochloric acid, ordinarily a voltage of 2.1 to 2.2 volts is required, but with my process I may produce chlorine by electrolysis of cupric chloride or ferric chloride at voltages as low as .72 volt. Because of this low voltage, I am able to produce chlorine from hydrochloric acid at lower power consumption than has been thought possible heretofore. The lower voltages are obtained at lower current densities; for example, the following table shows the effect of increased current density on voltage:

| Amperes per square foot | Voltage |
|---|---|
| 42 | 0.72 |
| 84 | 0.89 |
| 168 | 1.24 |
| 252 | 1.69 |
| 509 | 2.69 |

Ordinarily, I prefer to operate the cell at about 168 amperes per sq. ft. of cathode area because at this current density I get maximum production of chlorine at minimum cost. However, for installations where the unit cost of power is high, it may be preferable to work at the lower current densities in order to get the advantage of lower power consumption. This flexibility in power consumption of my cell is an advantage, since it makes the cell suitable for a wide range of applications. Likewise, where power costs are low, it is advantageous to run the cell at high current densities to get a greater output of chlorine for a given unit of capital investment. This flexibility in operation is not obtained either in the direct electrolysis of hydrochloric acid or in the production of chlorine by electrolysis of sodium chloride, or in any other process with which I am familiar. The reason for this flexibility in operation is that the electrolyte used in the cell of the present invention has a very high conductivity and the absence of hydrogen evolution during electrolysis eliminates gas blanketing and resulting polarization of the cathode, thus permitting the use of the high current densities.

As hereinbefore stated, the effluent reduced metallic chloride from the cell is re-oxidized with HCl and oxygen in the tower 3 or in other suitable apparatus, and in that way chlorine is introduced into the solution for further electrolysis. The presence of any reduced metallic chloride in the solution fed to the electrolytic cells results in loss of current efficiency since the first chlorine generated is absorbed in oxidizing the reduced metallic ions. Therefore, it is important that the electrolyte to be fed to the cells should be completely oxidized.

I find that I can oxidize cuprous chloride or ferrous chloride in the aqueous solution in the oxidizing unit 3 to the extent of 99 percent or higher in either a packed column or a liquid column of the material through which diffused oxygen admixed with HCl is blown. In the packed column the oxygen may flow either countercurrent or concurrent to the solution. If desired, HCl may be introduced into the electrolyte either before, during or after its passage through the tower 3. The air or oxygen is, however, introduced in the tower.

In order to reduce capital costs, I find it desirable to use a single large oxidizing tower or unit in conjunction with a multiple cell installation to combine the electrolytic solutions from the series of cells, and to pass the mixture to the oxidizing unit and to recirculate the oxidized electrolyte to the cells for further electrolysis. Such operation is efficient and economical.

While I have referred to oxygen herein as the oxidizing gas, any gas containing oxygen, such as air, may be used. Air is ordinarily preferred because of ready availability and low cost. The term "oxygen" as used herein shall refer to pure oxygen, air, or any suitable gaseous mixture containing oxygen.

During the oxidation, water is formed which tends to dilute the electrolyte and if the composition of the electrolytic solution is to be kept constant, it is necessary to provide for removal of this water.

I prefer to use either copper chloride or iron chloride or a mixture of these chlorides as the electrolyte, since these two metallic chlorides give lower power consumption per pound of chlorine, greater chlorine purity, less critical flow rate control and greater ease of oxidation than other commercially available metallic chlorides. My invention is not, however, restricted to the use of these two chlorides, but I may use any metallic chloride having two valence states, and which is reducible from the higher valence state to the lower valence state by electrolysis with evolution of chlorine, and which may be reoxidized from a lower valence state to the higher valence state with oxygen in the presence of hydrogen chloride.

I have found generally that operation with copper chloride is preferable to operation with iron chloride. Chromium chloride which is reducible from chromic chloride to chromous chloride may also be used, although it does not give as satisfactory results as the aforementioned chlorides.

Operating in accordance with the procedures set forth above, I have found it possible to circulate the electrolyte repeatedly for months without substantial loss in efficiency. There appears to be no deterioration of cell performance due to recirculation of the electrolyte. In some cases, it may be desirable to purify the hydrogen chloride used in the oxidizing unit or to purify the electrolytic solution if impurities are introduced by the hydrogen chloride as may happen from HCl derived from the manufacture of salt cake or from other operations wherein impurities are found in the HCl. It is also desirable to filter the electrolyte during each cycle to remove any solids which might plug the cathode.

Whereas I prefer to operate the cell without a diaphragm, in some cases a diaphragm is advantageous since it very substantially increases current efficiency. Also, a diaphragm causes a somewhat increased voltage and results in an unfavorable effect on power consumption. The use of a diaphragm is particularly advantageous where a cell constructed with a horizontal cathode is used. On such a cathode a sand diaphragm or other granular material which is inert to the electrolyte may readily be used.

In one installation of my process, I operated a 750 ampere cell of the general structure shown in Figure II containing therein a porous graphite cathode having a thickness of ¾" and a water permeability of 30 gallons/sq.ft./min. at 5 lbs./sq. in. pressure and at 1.35 volts. The electrolytic solution fed to the cell contained about 15 percent by weight of cupric chloride and 20 percent by weight of HCl. It was fed to the cell at a flow rate of 2.7 gal./hr./sq.ft. of cathode area, and at a temperature of 80° C. This cell was operated without a diaphragm and the cathode was totally submerged. The cell was operated at a cathode current density of 168 amperes/sq.ft. Due to the larger anode area, the current density at the anode was about 100 amperes/sq.ft. The current efficiency in this operation was high, being above 85 percent, and the cell produced chlorine of over 99.0 percent purity. The effluent reduced electrolytic solution from the cell contained about 10 percent cupric chloride by weight, 4 percent cuprous chloride, and 20 percent HCl, by weight. The electrolyte was re-oxidized in an oxidizing unit with air and HCl using about 25 cu. ft. of free air per gallon of electrolytic solution, and was then recirculated to the cell. The cell was operated for a long period of time under these conditions without change in these performance characteristics.

While I have particularly described my process for recovering chlorine values from HCl with reference to a certain cell and certain operating conditions, it will be obvious to those skilled in the art that the process is not limited to the specific structure shown or other specific conditions outlined but may be practiced in other ways and in different embodiments of cells within the scope of the claims hereinafter made.

I claim:
1. In an electrolytic process for the recovery of chlorine values from hydrogen chloride in an electrolytic cell having a resistant anode and a porous cathode, the process comprising the steps of introducing a polyvalent reducible metal chloride aqueous solution containing from about 5 to 25% hydrogen chloride and from about 5 to 17% of reducible metal chloride into said cell, electrolyzing the polyvalent metal chloride from a higher state of valence to a lower state of valence at a substantially uniform current density across a substantially uniform electrolytic gap formed between the anode and cathode in said cell, withdrawing chlorine from the space between the anode and cathode of said cell, withdrawing the partially reduced electrolyte from the cell only through the electrolytically active portion of the porous cathode which forms one wall of said cell, contacting the withdrawn aqueous solution containing hydrogen chloride with oxygen to re-oxidize the polyvalent metal chloride to said higher state of valence and produce water, returning the obtained solution to the space between the anode and cathode of said cell, and maintaining the hydrochloric acid content and polyvalent metal chloride content of said electrolyte as fed to the cell substantially constant.

2. In an electrolytic process for the recovery of chlorine values from hydrogen chloride in an electrolytic cell having a resistant anode and a porous cathode, the process comprising the steps of introducing a polyvalent reducible metal chloride aqueous solution containing from about 5 to 25% hydrogen chloride and about 5 to 17% of reducible polyvalent metal chloride into said cell, electrolyzing said polyvalent metal chloride from a higher state of valence to a lower state of valence at a substantially uniform current density across a substantially uniform electrolytic gap formed between the anode and cathode in said cell, withdrawing chlorine from the space between the anode and cathode of said cell, immediately withdrawing the partially reduced electrolyte from the cell only through the electrolytically active portion of the porous cathode which forms one wall of said cell, contacting the withdrawn aqueous solution containing hydrogen chloride with oxygen to re-oxidize the polyvalent metal chloride to said higher state of valance, removing the water liberated during oxidation, restoring the concentration of hydrochloric acid in the electrolyte by adding hydrochloric acid, returning the obtained solution to the space between the anode and cathode of said cell, and maintaining the hydrochloric acid content and polyvalent metal chloride content of said electrolyte as fed to the cell substantially constant.

FRANK S. LOW.

REFERENCES CITED

The following references are of record in the file of this patent:

UNITED STATES PATENTS

| Number | Name | Date |
| --- | --- | --- |
| 586,236 | Hulin | July 13, 1897 |
| 1,246,099 | Hulin | Nov. 13, 1907 |
| 2,204,733 | Miller | June 18, 1940 |
| 2,273,795 | Heise | Feb. 17, 1942 |
| 2,273,799 | Janes | Feb. 17, 1942 |

FOREIGN PATENTS

| Number | Country | Date |
| --- | --- | --- |
| 348,792 | Great Britain | May 21, 1931 |

OTHER REFERENCES

"Comprehensive Treatise on Inorganic and Theoretical Chemistry," by Mellor, vol. 2 (1927).

"Transactions of the Electrochemical Society," vol. 75 (1939), pages 147, 153, 154.